Feb. 15, 1949.   J. H. NELSON ET AL   2,461,759
ALTERNATING CURRENT BRAKE MOTOR
Filed Feb. 26, 1945   2 Sheets-Sheet 1

Inventors:
James Holly Nelson and
Hoyt Servis.
By: Zabel, Carlson, Gritzbaugh & Wells Attys.

Feb. 15, 1949.   J. H. NELSON ET AL   2,461,759
ALTERNATING CURRENT BRAKE MOTOR
Filed Feb. 26, 1945   2 Sheets-Sheet 2

Inventors:
James Holly Nelson and
Hoyt Servis.
By: Zabel, Carlson, Gritzbaugh & Wells Attys.

Patented Feb. 15, 1949

2,461,759

UNITED STATES PATENT OFFICE 2,461,759

ALTERNATING CURRENT BRAKE MOTOR

James Holly Nelson and Hoyt Servis, Racine, Wis., assignors to The Dumore Company, Racine, Wis., a corporation of Wisconsin Application February 26, 1945, Serial No. 579,768

4 Claims. (Cl. 188—171)

This invention relates to alternating current brake motors, and in particular, to an improved electrically actuated brake construction.

Direct current electric brake motors in general have been provided with spring actuated braking means which are rendered ineffective during energization of the field by means of an electromagnet. In adapting such construction to alternating current motors, certain difficulties are encountered in the construction of a properly operating alternating current magnet. One of the difficulties is the hum or the chatter of the armature of the alternating current magnet. Another difficulty is the provision of a compact construction which will carry sufficient flux to permit the use of a relatively strong brake spring.

An object of this invention is to provide a compact construction in which the electromagnet surrounds the armature shaft and is provided with a plurality of pairs of pole pieces which are circumferentially spaced from each other around a doughnut shaped winding.

Another object is to provide an armature construction in which a separate armature is provided for each pair of pole pieces, the separate armatures being mounted so that each may seek its own attracted position, thereby reducing any tendency of the armature to hum. The separate armatures are secured to one another by means of an additional element which forms a part of the brake.

The objection to the use of a common armature, for all of the separate pole pieces is that from a practical viewpoint it is impossible to form a laminated core structure in which the armature contacting surfaces of the pole pieces all lie in the same plane. For instance, if one of the pole pieces lies below the plane defined by the others, the alternating flux will cause the common armature to flex or to vibrate, thereby causing a hum. In the construction herein shown and described, a flux carrying member contacts each of the pole pieces whenever the electromagnetic winding is energized.

A further object is to provide an improved arrangement of pole pieces, and of shading means therefor, thereby further reducing any tendency to hum.

Various other objects, features and advantages will become apparent as this description proceeds.

With reference now to the drawings which illustrate a preferred embodiment of this invention, and in which like reference numerals designate like parts, Fig. 1 is a section through a brake motor taken along line 1—1 of Fig. 2;

Figure 1:
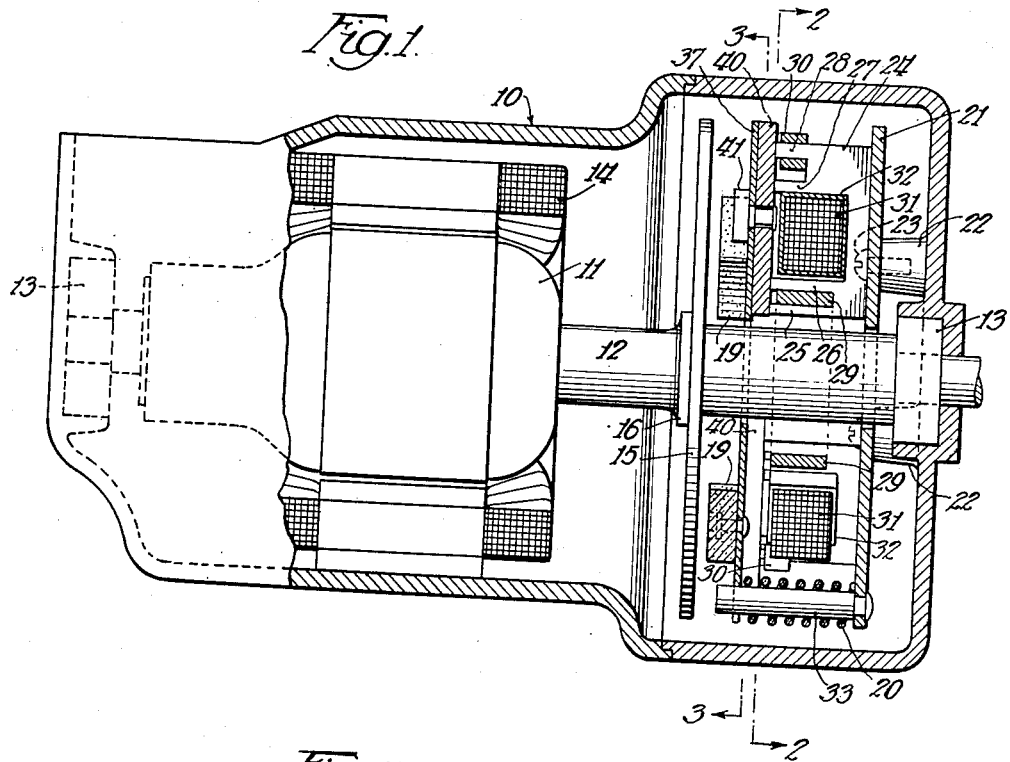

The numeral 10 designates a motor housing in which are disposed the usual armature 11 and field 14, the armature being mounted on an armature shaft 12 which is journaled in bearings 13. A brake disk 15 is carried by the armature shaft 12, and is rigidly associated therewith by means of a hub 16.

An electromagnet, and a cooperating armature assembly designated generally by the reference numerals 7 and 18, are disposed at one end of the housing 10 and surround the armature shaft 12. The armature assembly 18 includes a plurality of brake shoes 19 which are disposed in such a position that they cooperate with the brake disk 15 being urged into engagement therewith by a plurality of springs 20. The electromagnet 17 is connected in series with the field 14 so that upon energization of the motor, the armature assembly 18 is retracted against the bias of springs 20 thereby disengaging the brake disk 15. Upon de-energization of the motor circuit, the armature assembly 18 is released and the brake shoes 19 are thereupon urged into engagement with the brake disk 15, thereby braking the motor.

The electromagnet 17 includes a mounting plate 21 which is secured to lugs 22 by means of suitable screws 23, the lugs 22 preferably being cast integrally with the housing 10. Four U-shaped core members 24 are suitably secured to the mounting plate 21, the ends of the core members being bifurcated to provide a pair of inner pole pieces 25 and 26, and a pair of outer pole pieces 27 and 28. A common shading ring 29 is disposed between pole pieces 25 and 26, thereby shading all of the pole pieces 25. Separate shading rings 30 are provided for each of the outer pole pieces 28. The core members 24 may be of the usual laminated construction.

A doughnut shaped winding 31 is placed in the U-shaped core members 24, and the usual protective coverings 32 may be provided between the winding and the core members. It will be seen therefore that when the winding 31 is energized by an alternating current, flux will pass through the core members 24, the flux of the pole pieces 25 and 28 lagging behind the flux of the pole pieces 26 and 27 due to the shading.

The armature assembly 18 includes a plate 37 which is apertured for the armature shaft 12 and which is non-rotatably mounted with respect to the housing 10 and the electromagnet 17. The brake shoes 19 are secured to one surface of the plate 37. The springs 20 are confined between the plates 37 and 21. The position of the springs 20 is determined by posts 33 which may be riveted or otherwise secured to the plate 21, and which extend through notches 36 in the plate 37 and serve to guide its motion toward and away from the electromagnet 18.

Figure 4:
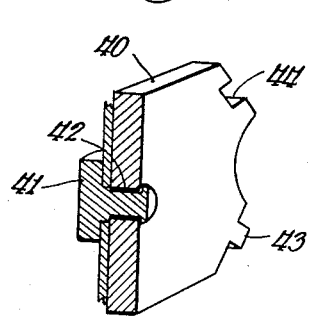
Fig. 4 is an enlarged detail of the rivet by means of which the separate armature pieces are secured to the armature assembly.
Figure 2:
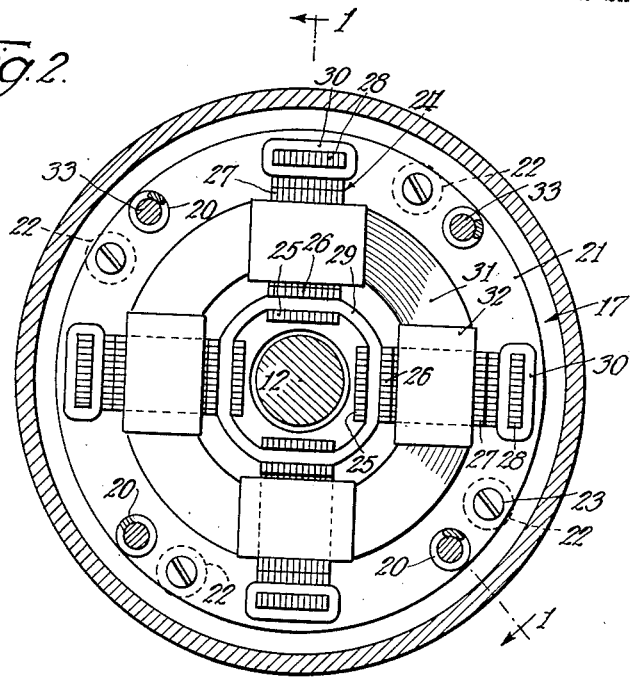
Fig. 2 is a section taken along line 2—2 of Fig. 1, and showing the construction of the electromagnet.
Figure 3:
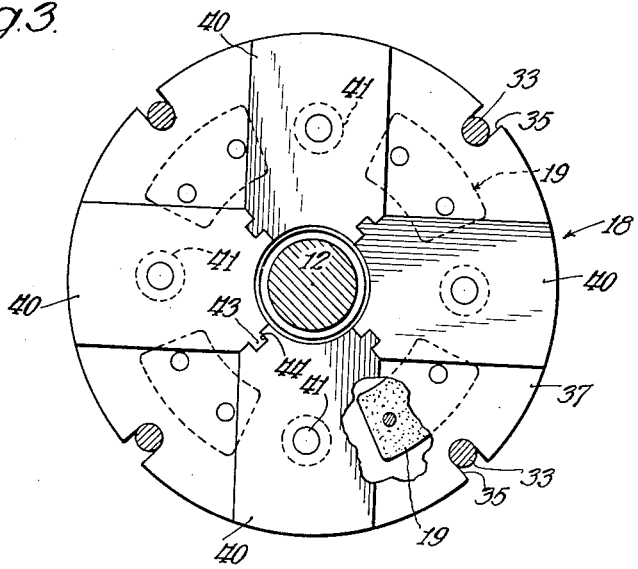
Fig. 3 is a section taken along line 3—3 of Fig. 1, and showing the construction of the armature.

To the surface of the plate 37 which faces the electromagnet 17 are secured a plurality of separate armature pieces 40 by means of rivets 41. The apertures in the armature pieces 40, through which apertures the rivets 41 pass, are somewhat larger than the diameter of the rivet so as to provide a clearance as indicated by the reference numeral 42 in Fig. 4. The result of this construction is that the armature pieces are loosely mounted with respect to the plate 37, and are thereby permitted a certain amount of wobble. The inner ends of the separate armature pieces 40 are so shaped that the edge of one armature piece abuts the edge of an adjacent armature piece. In order to prevent the rotation of armature pieces 40 in the plane in which they are disposed, interlocking means between the abutting edges of the different armature pieces are provided. This interlocking means may comprise lugs 43 formed along one of the abutting edges of each armature piece, and a corresponding recess 44 formed in the other edge of each armature piece. The arrangement is such that the lug of one armature piece fits into the recess of an adjacent armature piece, and therefore rotation of the armature pieces about the rivets 41 is prevented. It will be noted, however, that this interlocking arrangement places no restriction on the movement of the armature pieces in a direction perpendicular to the plane of plate 37.

Upon energization of the winding 31, each armature piece 40 will be attracted separately by the pole pieces 25, 26, 27 and 28 of the correspondingly positioned core member 24. Thus the plate 37 is caused to be displaced axially against the compression of springs 20. As each armature piece 40 moves into attracted position, it is free to seek its own limit of motion as determined by its cooperating pole pieces, one end of the armature piece 45 engaging pole pieces 25 and 26, and the other end engaging pole pieces 27 and 28. Thus there is no armature hum which is ordinarily occasioned by the provision of a common armature for several pairs of poles, for the reason that there is no gap due to imperfect alignment of the pole pieces. It will also be noted that the shaded poles 25 and 28 cause the armature pieces to remain in attracted position during current reversal in the winding 31.

Although only a preferred embodiment of this invention has been shown and described herein, it will be understood that various modifications and changes may be made without departing from the spirit of this invention. The appended drawings and foregoing description are deemed to be illustrative only, and the invention is limited only by the appended claims.

We claim:

1. In an alternating current brake motor, the combination of an armature shaft, a disk secured thereto and rotating therewith, a non-rotatable braking element disposed adjacent said disk, means to urge said braking element into braking contact with said rotating disk, a toroidal electromagnetic alternating current winding surrounding said armature shaft and having a plurality of pairs of pole pieces associated therewith each pole piece of each pair being slotted, shading means disposed in said slots, and a separate armature in the form of a plate for each pair of pole pieces, said separate armatures being secured to said braking element in a manner such as to permit a slight adjustment in the position of each as each seeks its attracted position.

2. In an electric brake having an alternating current electromagnet, which magnet is provided with a plurality of circumferentially spaced pairs of poles, an armature construction comprising a disk having a plurality of separate armatures, each armature being loosely secured to said disk by means of a rivet, and the inner ends of said armatures being in contact with each other and being provided with interlocking means so as to prevent rotation of the separate armatures about their mounting rivets.

3. In an alternating current brake motor, the combination of an armature shaft, a brake disk secured thereto and rotating therewith, an axially displaceable braking element mounted for cooperation therewith, means for biasing said braking element into engagement with said brake disk, a toroidal winding surrounding said armature shaft adjacent said braking element, a plurality of U-shaped core members circumferentially spaced around said winding, the end portions of each being provided with a pair of pole pieces, each pole piece being slotted, a common shading ring surrounding said armature shaft and received within the slots of the inner pole piece of each pair for shading the inner half of each of said inner pole pieces, a separate shading ring received within the slots of each of the outer pole pieces of each pair for shading the outer half of each of said outer pole pieces, and an armature member provided for each of said pairs of pole pieces, said winding being disposed adjacent said braking element, and said separate armatures being loosely secured to said braking element to retract the same against the action of said biasing means.

4. In a brake motor of the type which includes a single alternating current electromagnet winding provided with a plurality of pairs of pole pieces lying in substantially a common plane, an armature for each pair of pole pieces, a common mounting member, means for loosely securing each armature to said mounting member, said armatures being arranged so that an edge of one abuts an edge of another, and a projection on the abutting edge of one armature which fits into a corresponding notch in the abutting edge of the adjacent armature whereby rotation of said armatures with respect to said common mounting means is prevented.

JAMES HOLLY NELSON.
HOYT SERVIS.

REFERENCES CITED

The following references are of record in the file of this patent:

UNITED STATES PATENTS

| Number | Name | Date |
| --- | --- | --- |
| 552,103 | Daniels | Dec. 31, 1895 |
| 825,327 | Larson | July 10, 1906 |
| 1,005,855 | Lindquist | Oct. 17, 1911 |
| 1,062,017 | Larson | May 20, 1913 |
| 1,837,928 | Trombetta | Dec. 22, 1931 |
| 2,009,121 | Price | July 23, 1935 |
| 2,059,028 | Price | Oct. 27, 1936 |
| 2,077,888 | Larsh | Apr. 20, 1937 |
| 2,121,889 | Sousedik | June 28, 1938 |
| 2,219,157 | Zenner | Oct. 22, 1940 |
| 2,223,021 | Quam | Nov. 26, 1940 |
| 2,395,905 | Oetzel | Mar. 5, 1946 |